United States Patent [19]

Abolins

[11] 4,317,761

[45] Mar. 2, 1982

[54] CLAY FILLED POLYPHENYLENE ETHER COMPOSITIONS

[75] Inventor: Visvaldis Abolins, Delmar, N.Y.

[73] Assignee: General Electric Company, Pittsfield, Mass.

[21] Appl. No.: 209,797

[22] Filed: Nov. 24, 1980

[51] Int. Cl.$^3$ .............................................. C08K 5/49
[52] U.S. Cl. .................................... 524/141; 524/445
[58] Field of Search ............. 260/30.6 R, 37 R, 42.47

[56] References Cited

U.S. PATENT DOCUMENTS

| | | | |
|---|---|---|---|
| 3,708,455 | 1/1973 | Nakanishi et al. | 260/37 R |
| 3,850,879 | 11/1974 | Anderson | 260/37 R |
| 3,923,929 | 12/1975 | Wright et al. | 260/37 R |
| 4,166,812 | 9/1979 | Lee | 260/42.47 |
| 4,233,199 | 11/1980 | Abolins et al. | 260/42.22 |
| 4,239,673 | 12/1980 | Lee | 260/30.6 R |

*Primary Examiner*—Lewis T. Jacobs
*Attorney, Agent, or Firm*—Hedman, Casella, Gibson and Costigan

[57] ABSTRACT

Compositions comprising polyphenylene ether, an impact modifier such as an A-B-A$^1$ block copolymer, a plasticizer and a particular clay filler in which the particles have a mean particle size of no greater than 0.6 micron, preferably between 0.1 and 0.6 micron, and a surface area of at least 15 m$^2$/g. The clay should be essentially free of large particles commonly known as "grit", and should also be substantially non-agglomerated or clump-free. The compositions when molded possess unexpectedly high Gardner impact resistance.

10 Claims, No Drawings

CLAY FILLED POLYPHENYLENE ETHER COMPOSITIONS

This invention relates to clay filled polyphenylene ether compositions, and more specifically, to compositions composed of polyphenylene ether, an impact modifier and a plasticizer which also contain clay particles characterized by a certain specified particle size and surface area.

BACKGROUND OF THE INVENTION

The polyphenylene ether resins are well known in the art as comprising a family of thermoplastic materials which are suitable for various engineering purposes. These may be made by catalyzed and non-catalyzed processes described in the patent literature, such as in Hay, U.S. Pat. Nos. 3,306,874 and 3,306,875, and in Stamatoff, U.S. Pat. Nos. 3,257,357 and 3,257,358, all of which are incorporated herein by reference.

It is known that the polyphenylene ether resins may be admixed with polystyrene, either unmodified or modified, to produce compositions having properties better than those of either of the two polymers individually. Such compositions are disclosed in Cizek, U.S. Pat. No. 3,383,435, which is incorporated oherein by reference.

To reduce the cost, it has been proposed to add mineral fillers such as aluminum silicate, calcium carbonate, magnesium silicate, calcium silicate, silica or others, to compositions containing a polyphenylene ether resin and polystyrene. Compositions comprising a polyphenylene ether resin, a rubber modified high impact polystyrene and aluminum silicate are disclosed in U.S. Pat. No. 4,166,812.

Copending application Ser. No. 755,025, filed Dec. 28, 1976, Board of appeals discloses compositions comprising a polyphenylene ether resin, alone, or in combination with an impact modifier which is not a high impact rubber modified polystyrene, a mineral filler and a plasticizer.

It is known that the addition of mineral fillers to polyphenylene ether resins can increase the rigidity and dimensional stability of the polymers. The toughness of the resulting composite is usually lower than that of the mineral filled-free polymer, however. It has been found that some mineral fillers increase the rigidity of the polymer and provide ductile composites having good impact resistance. Such benefits are more pronounced in falling weight-type impact tests, such as Gardner impact resistance. This type of impact resistance is much more important in actual practice than the impact resistance as measured by other means such as the Izod impact test.

It has now been discovered that as among mineral fillers in general, particulate clay and specifically clay having a mean particle size no greater than 0.6 micrometer (micron) and a surface area of 15 square meters per gram (m²/g) or more, provides better Gardner impact strength than expected in certain polyphenylene ether compositions. These compositions are described below.

DESCRIPTION OF THE INVENTION

According to this invention, there are provided thermoplastic compositions having improved impact strength when molded, comprising:
(a) a polyphenylene ether resin, alone, or together with an impact modifier;
(b) an effective amount of a plasticizer; and
(c) a particulate clay filler having a mean particle size no greater than 0.6 micron and a surface area of at least 15 square meters per gram.

Preferably, the particulate clay filler is substantially free of large, gritty particles and has been well dispersed to avoid the formation of lumps. The presence of grit and clumps may cause stress concentrations in the clay-resin composites which lower the impact resistance and also other physical properties.

The clay filler of the compositions of this invention can be prepared by conventional methods, using, e.g., sieving means to separate and collect clay particles having the appropriate size, preferably 0.1 to 0.6 micron and surface area, preferably 15 to 30 m²/g, and to separate gritty particles and clumps.

The preferred polyphenylene ether resins are those having the formula:

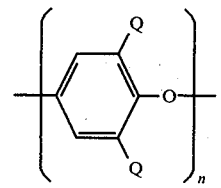

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

The preparation of polyphenylene ether resins corresponding to the above formula is described in the above-mentioned patents of Hay and Stamatoff.

The most preferred polyphenylene ether resin for use in this invention is poly(2,6-dimethyl-1,4-phenylene)ether.

The particular impact modifier employed in the compositions is not critical and can be selected from a wide variety of elastomeric materials. By way of illustration, the term "impact modifier" employed herein includes copolymers of styrene and elastomeric materials such as acrylonitrile, EPDM rubber, maleic anhydride or diene rubber. Examples include copolymers of styrene and acrylonitrile, copolymers of styrene and butadiene, copolymers of styrene and maleic anhydride and copolymers of styrene and EPDM rubber. Other examples include terpolymers of styrene, acrylonitrile and butadiene, and terpolymers of styrene, butadiene and styrene of the A-B-A type or radial teleblock type, either hydrogenated or unhydrogenated.

Special mention is made of the A-B-A¹ block copolymers wherein terminal blocks A and A¹ are the same or different and are derived from a vinyl aromatic compound, e.g., styrene, α-methyl styrene, vinyl toluene, vinyl xylene, vinyl naphthalene, and the like, and center block B is derived from a conjugated diene, i.e., butadiene, isoprene, 1,3-pentadiene, 2,3-dimethyl butadiene, and the like. Hydrogenated derivatives of the foregoing are also preferred. Both the unhydrogenated and hydrogenated forms can be prepared by methods described in the patent literature, e.g., U.S. Pat. Nos. 3,251,905; 3,231,635; and 3,431,323, which are incorporated herein by reference.

The plasticizer can be selected from among any materials known to impart compatibility with polyphenylene ether resin. Preferably, the plasticizer is an aromatic phosphate, and especially a compound having the formula:

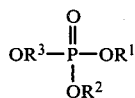

wherein $R^1$, $R^2$ and $R^3$ are the same or different and are alkyl, haloalkyl, cycloalkyl, halocycloalkyl, aryl, haloaryl, alkyl substituted aryl, haloalkyl substituted aryl, aryl substituted alkyl, haloaryl substituted alkyl, hydroxyalkyl, hydroxyaryl, hydroxyalkaryl, halogen and hydrogen.

Examples include cresyl diphenyl phosphate, 2-ethylhexyl diphenyl phosphate, tricresyl phosphate, triisopropylphenyl phosphate, triphenyl phosphate, triethyl phosphate, dibutyl phenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-n-hexyl phosphate, di-n-octyl phenyl phosphate, di-2-ethylhexyl phenyl and tri-2-ethylhexyl phosphate or mixtures thereof. Especially preferred is triphenyl phosphate.

The ingredients in the compositions of this invention can vary widely. In preferred embodiments, the compositions contain from 5 to 95 parts by weight of polyphenylene ether, from 95 to 5 parts by weight of impact modifier, from 5 to 50 parts by weight of plasticizer and from 5 to 50 parts by weight of clay.

Other ingredients, such as stabilizers, flame retardant agents, drip retardands, antioxidants, antistatic agents, coloring agents, pigments, mold release agents, and the like, can also be included for their conventionally employed purposes.

The compositions of this invention are prepared in any manner. Usually, however, the ingredients are formed into a preblend by tumbling in a mixer, the preblend is extruded at a temperature of from 550° F. to 620° F., the extrudate is cut into smaller pieces, and the pieces are injection molded at a temperature of from 530° F. to 640° F.

DESCRIPTION OF THE PREFERRED EMBODIMENTS

The compositions of this invention are illustrated in the following examples, which are not intended to be limiting.

EXAMPLES 1-14

Compositions according to this invention are prepared by tumbling the ingredients, extruding the resulting blend in a Werner Pfleiderer 28 mm twin screw machine, at a temperature of 590° F. and injection molding the extrudate in a Newbury injection molding machine at 600° F. (mold temperature 180° F).

The molded compositions are evaluated for physical properties according to ASTM standards. The compositions and properties are reported in Tables I and II.

TABLE I.

Compositions Comprising a Polyphenylene Ether Resin, an A-B-A Block Copolymer, Triphenyl Phosphate and Clay Filler

| Ingredients parts by weight | 1 | 2* | 3* | 4* | 5* | 6* | 7* |
|---|---|---|---|---|---|---|---|
| Poly(2,6-dimethyl-1,4-phenylene)ether | 95 | 95 | 95 | 95 | 95 | 95 | 95 |
| Hydrogenated styrene-butadiene-styrene copolymer[a] | 5 | 5 | 5 | 5 | 5 | 5 | 5 |
| Triphenyl phosphate | 10 | 10 | 10 | 10 | 10 | 10 | 10 |
| ASP-100[b] (clay) | 25 | — | — | — | — | — | — |
| ASP-105[b] (clay) | — | 25 | — | — | — | — | — |
| ASP-170[b] (clay) | — | — | 25 | — | — | — | — |
| ASP-900[b] (clay) | — | — | — | 25 | — | — | — |
| ASP-400[b] (clay) | — | — | — | — | 25 | — | — |
| Satintone 4[b] (clay) | — | — | — | — | — | 25 | — |
| Satintone 1[b] (clay) | — | — | — | — | — | — | 25 |

| Physical Properties | Sample Designations | | | | | | |
|---|---|---|---|---|---|---|---|
| | 1 | 2* | 3* | 4* | 5* | 6* | 7* |
| Filler | ASP-100 | ASP-105 | ASP-170 | ASP-900 | ASP-400 | Satintone No. 4 | Satintone No. 1 |
| Mean particle size of filler (microns) | 0.55 | 0.55 | 0.55 | 1.5 | 4.8 | 1.0 | 20 |
| Surface area of filler (m²/g) | 14.6–16.2 | 11.1–13.8 | 11.5–14.3 | 11 | 7.2 | 8.9–9.5 | 7.3–8.5 |
| Gardner impact strength of composite (in-lbs) | 235 | 63 | 27 | 9 | 2 | 12.5 | 6.5 |

[a] Shell Chemical Company's KRATON G 1652
[b] Engelhard Minerals & Chemicals Corporation
*comparison experiment

TABLE II.

Compositions Comprising a Polyphenylene Ether Resin, an A-B-A Block Copolymer Triphenyl Phosphate and Clay Filler

| Ingredients, parts by weight | 8 | 9 | 10 | 11 | 12* | 13* | 14* |
|---|---|---|---|---|---|---|---|
| Poly(2,6-dimethyl-1,4-phenylene)ether | 95 | 95 | 95 | 95 | 95 | 95 | 95 |
| Hydrogenated styrene-butadiene-styrene copolymer[a] | 5 | 5 | 5 | 5 | 5 | 5 | 5 |
| Triphenyl phosphate | 10 | 10 | 10 | 10 | 10 | 10 | 10 |
| HG-90[b] (clay) | 25 | — | — | — | — | — | — |
| Suprex[b] (clay) | — | 25 | — | — | — | — | — |
| Nulok 321[b] (clay) | — | — | 25 | — | — | — | — |
| Nucap 200[b] (clay) | — | — | — | 25 | — | — | — |
| Al—Sil-Ate NCF[c] (clay) | — | — | — | — | 25 | — | — |
| Al—Sil-Ate NC[c] (clay) | — | — | — | — | — | 25 | — |
| Al—Sil-Ate HO2[c] (clay) | — | — | — | — | — | — | 25 |

| Physical Properties | 8 | 9 | 10 | 11 | 12* | 13* | 14* |
|---|---|---|---|---|---|---|---|
| Filler | HG-90 | Suprex | Nulok No. 321 | Nucap No. 200 | Al—Sil-Ate NCF | Al—Sil-Ate NC | Al—Sil-Ate NO2 |
| Mean particle size of filler (microns) | 0.3 | 0.3 | 0.3 | 0.3 | 97% below 2 | 82% below 2 | 82% below 2 |
| Surface area of filler (m²/g) | 22 | 22 | 22 | 22 | 14–16 | 12–14 | 12–14 |
| Gardner impact strength of composite (in-lbs) | 225 | 225 | 190 | 210 | 95 | 15 | 15 |

*comparison experiment
[a]Shell Chemical Company's KRATON G 1652
[b]J.M. Huber Corporation
[c]Freeport Kaolin Company It can be seen that the compositions according to the invention, 1, 8, 9, 10 and 11, each containing clay having a mean particle size no greater than 0.6 micron and a surface area of at least 15 m²/g, provide clearly better Gardner impact strength in comparison with the compositions containing a clay filler not in accordance with the invention, 2–7 inclusive and 12–14 inclusive.

Other modifications and variations of this invention are possible in view of the description. It is to be understood, therefore, that changes may be made in the particular embodiments shown herein without departing from the principles or scope of the invention defined in the appended claims and without sacrificing the chief benefits.

I claim:

1. A thermoplastic composition comprising:
   (a) a polyphenylene ether resin, alone, or together with an impact modifier;
   (b) an effective amount of a plasticizer; and
   (c) a particulate clay filler having a mean particle size no greater than 0.6 micron and a surface area of at least 15 square meters per gram 2. A composition as defined in claim 1, in which the impact modifier is an A-B-A¹ block copolymer wherein terminal blocks A and A¹ are derived from a vinyl aromatic compound and center block B is derived from a conjugated diene.

3. A composition as defined in claim 2, in which the terminal blocks are polystyrene and the center block is polybutadiene.

4. A composition as defined in claim 2, in which the A-B-A¹ block copolymer has been hydrogenated.

5. A composition as defined in claim 1, in which the polyphenylene ether resin has the formula

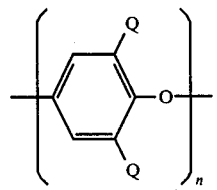

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

6. A composition as defined in claim 1, in which the polyphenylene ether resin is poly(2,6-dimethyl-1,4-phenylene) ether.

7. A composition as defined in claim 1, in which the plasticizer is triaryl phosphate.

8. A composition as defined in claim 1, in which the plasticizer is triphenyl phosphate.

9. A composition as defined in claim 1, comprising from about 5 to about 95 parts by weight of said polyphenylene ether resin, from about 95 to 5 parts by weight of said impact modifier, from about 5 to about 50 parts by weight of said plasticizer and from about 5 to about 50 parts by weight of said clay.

10. A composition as defined in claim 1, in which the particulate clay filler has a mean particle size of from 0.1 to 0.6 micron and a surface area of from 15 to 30 square meters per gram.

* * * * *